United States Patent [19]

Muckenheim

[11] 4,062,710
[45] Dec. 13, 1977

[54] METHOD OF COVERING A PIPE, ESPECIALLY A STEEL PIPE, AND OTHER METALLIC ARTICLES WITH THERMOPLASTIC SYNTHETIC MATERIAL

[75] Inventor: Fritz Muckenheim, Hohenlimburg, Germany

[73] Assignee: Hoesch Werke Aktiengesellschaft, Dortmund, Germany

[21] Appl. No.: 685,132

[22] Filed: May 11, 1976

[30] Foreign Application Priority Data

May 13, 1975 Germany .............................. 2521198

[51] Int. Cl.² .......................................... B65H 81/00
[52] U.S. Cl. .................................... 156/187; 156/195
[58] Field of Search ............... 156/187, 188, 195, 429; 264/173

[56] References Cited

U.S. PATENT DOCUMENTS

| 2,713,383 | 7/1955 | Kennedy ............................. 156/195 |
| 3,126,306 | 3/1964 | Sherman ............................. 156/187 |
| 3,616,006 | 10/1971 | Landgraf et al. .................... 156/195 |
| 3,687,765 | 8/1972 | MacLean et al. .................... 156/195 |
| 3,802,908 | 4/1974 | Emmons ............................. 156/188 |
| 3,823,045 | 7/1974 | Hielema ............................. 156/195 |
| 3,972,761 | 8/1976 | Landgraf et al. .................... 156/195 |

Primary Examiner—David A. Simmons
Attorney, Agent, or Firm—Walter Becker

[57] ABSTRACT

A method of covering a metallic pipe and other metallic articles with thermoplastic synthetic material, especially polyethylene according to which the synthetic material is in the form of a foil leaving an extruder helically wound upon a heated-up rotating steel pipe. The thus applied foil is by means of a roller pressed onto the pipe to be covered. Prior to the foil contacting the steel pipe, the foil is passed over the pressing roller through an angle range of from 25° to 50°.

3 Claims, 1 Drawing Figure

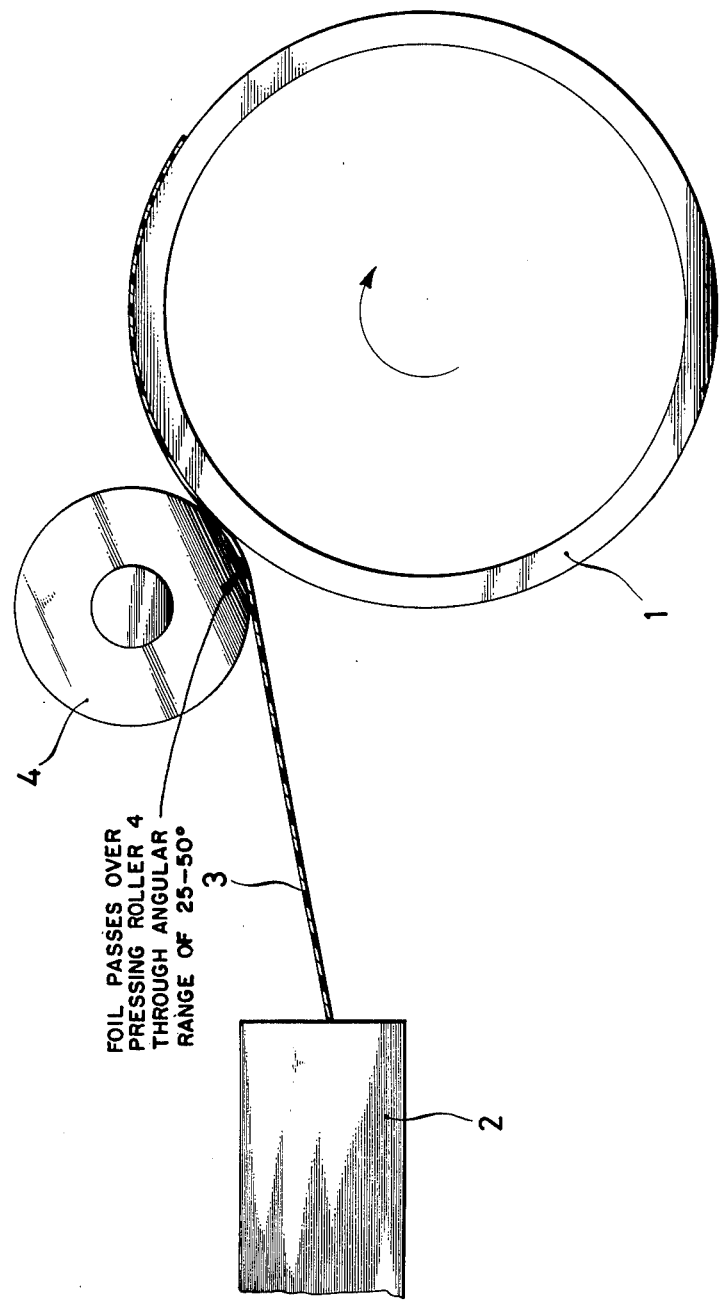

METHOD OF COVERING A PIPE, ESPECIALLY A STEEL PIPE, AND OTHER METALLIC ARTICLES WITH THERMOPLASTIC SYNTHETIC MATERIAL

The present invention relates to a method of covering metallic articles and pipes, especially a steel pipe, with thermoplastic synthetic material, especially polyethylene, according to which the synthetic material in the form of a foil leaving an extruder is wound helically onto a heated steel pipe being rotated, and according to which the synthetic material is pressed on by means of a roller. A method of this type has become known from German Auslegeschrift No. 12 28 052. According to this method, air bubbles are not completely excluded below the deposited foil so that a proper cover cannot be assured.

According to German Offenlegungsschrift No. 19 01 245, it has furthermore become known with a method according to the above mentioned type, to press on the foil by means of a roller, which foil is formed of a hose filled with air. The hose is on that side of the pipe which faces away from the pipe side to be covered, surrounded by a plurality of supporting rollers. These supporting rollers are arranged at a fixed distance from the axis of the hose-shaped roller and are kept within a frame. The supporting rollers loosely roll along and are provided for the purpose of preventing the not tautly inflated hose-shaped roller from bulging outwardly.

This known roller for pressing on a foil of synthetic material is rather expensive in its construction and has a limited durability.

It is an object of the present invention so to cover metal articles and pipes with thermoplastic synthetic material that over the entire pipe surface it will be possible by very simple means and with means having a long life to obtain a simple firmly adhering cover without enclosures of air.

These and other objects and advantages of the invention will appear more clearly from the following specification in connection with the accompanying drawing diagrammatically illustrating a device for practicing the method of the present invention.

More specifically, the method according to the invention for covering a steel pipe with thermoplastic synthetic material, especially polyethylene, according to which the synthetic material is in the form of a foil leaving an extruder wound helically onto the rotating heated steel pipe and is pressed onto the pipe by means of a roller is characterized primarily in that the foil prior to its contact with the steel pipe is passed over an angle range of from 25° to 50° on the pressing on roller.

Referring now to the FIGURE in detail, the FIGURE shows a steel pipe 1 which is to be covered with a cover of synthetic material. To this end, the pipe is heated up, preferably to a temperature of from about 170° to 180° C, and a suitable adhesion improving agent, e.g., polyethylene powder with additions of tar, is applied to the pipe surface to be covered by the thermoplastic material. Upon the thus pretreated pipe surface there is helically and in an overlapping manner wound a foil 3 of polyethylene discharged by an extruder 2. During this operation the steel pipe is rotated at a circumferential speed of preferably from 10 to 100 m per minute depending on the output of the extruder while the surface of the steel pipe is passed by said extruder at a constant speed, e.g., at a speed of 50–300 millimeters per revolution of the pipe to be covered. In this connection, it should be noted that the discharge opening of the extruder is inclined to the axis of the pipe to be covered. The greater angle the pipe axis forms with the discharge opening of the extruder is preferably about 95° and accordingly the smaller angle the pipe axis forms with the discharge opening of the extruder is about 85°. The direction in which the pipe surface moves by said extruder discharge opening is from said greater angle to said smaller angle. Prior to the foil 3 contacting the steel pipe 1, it is passed over an angle of 25° to 50° over a pressing roller 4. In this way, it is possible with very simple and durable means to obtain a firmly adhering cover for the pipe without air enclosures.

It is, of course, to be understood that the present invention is, by no means, limited to the specific showing in the drawing, but also comprises any modifications within the scope of the appended claims.

Thus, while the present invention has been described in connection with covering a steel pipe, it is to be understood that a steel pipe was merely mentioned by way of example, and that pipe of other metals and as a matter of fact, also surfaces of various metals could be treated in conformity with the present invention.

What I claim is:

1. A method of covering metallic articles and pipes, especially steel pipes, with thermoplastic synthetic material, which includes in combination the steps of: first heating the pipe having an outer peripheral surface to be covered to a temperature of from 170° to 190° C while simultaneously rotating said pipe at a circumferential speed of from 10 to 100 meters per minute, feeding said thermoplastic synthetic material in the form of a foil onto the heated outer peripheral surface of said rotating pipe while winding said foil helically around said pipe and with a roller pressing said roll against said heated outer peripheral surface, said foil immediately prior to its contact with said pipe also being arched over the roller in an angle range of only from 25° to 50° on the roller avoiding air occlusion.

2. A method in combination according to claim 1, which includes the step of employing polyethylene as thermoplastic material.

3. A method in combination according to claim 1, which includes helically winding said foil around said pipe so that the windings of said foil overlap each other.